US010360441B2

United States Patent
Ni et al.

(10) Patent No.: US 10,360,441 B2
(45) Date of Patent: Jul. 23, 2019

(54) IMAGE PROCESSING METHOD AND APPARATUS

(71) Applicant: TENCENT TECHNOLOGY (SHENZHEN) COMPANY LIMITED, Shenzhen (CN)

(72) Inventors: Hui Ni, Shenzhen (CN); Chengjie Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 81 days.

(21) Appl. No.: 15/680,976

(22) Filed: Aug. 18, 2017

(65) Prior Publication Data
US 2017/0344811 A1 Nov. 30, 2017

Related U.S. Application Data

(63) Continuation of application No. PCT/CN2016/106752, filed on Nov. 22, 2016, and a
(Continued)

(30) Foreign Application Priority Data

Nov. 25, 2015 (CN) .......................... 2015 1 0827420
Dec. 26, 2015 (CN) .......................... 2015 1 0996643

(51) Int. Cl.
G06K 9/00 (2006.01)
G06K 9/46 (2006.01)

(52) U.S. Cl.
CPC ..... *G06K 9/00288* (2013.01); *G06K 9/00248* (2013.01); *G06K 9/00281* (2013.01); *G06K 9/4642* (2013.01); *G06K 2009/4666* (2013.01)

(58) Field of Classification Search
CPC combination set(s) only.
See application file for complete search history.

(56) References Cited

U.S. PATENT DOCUMENTS 6,421,453 B1 7/2002 Kanevsky
9,110,501 B2 8/2015 Velusamy et al.
(Continued)

FOREIGN PATENT DOCUMENTS

CN 1421816 A 6/2003
CN 1439997 A 9/2003
(Continued)

OTHER PUBLICATIONS

The World Intellectual Property Organization (WIPO) International Search Report for PCT/CN2016/079163 dated Aug. 25, 2016 pp. 1-2.
(Continued)

*Primary Examiner* — Alex Kok S Liew
(74) *Attorney, Agent, or Firm* — Anova Law Group, PLLC

(57) ABSTRACT

Embodiments of the present disclosure provide an image processing method and apparatus. The method includes detecting a human face region in each frame of an image in a to-be-processed video; locating a lip region in the human face region; extracting feature column pixels in the lip region from each frame of the image; building a lip change graph based on the feature column pixels; and recognizing a lip movement according to a pattern feature of the lip change graph.

17 Claims, 2 Drawing Sheets

Related U.S. Application Data continuation of application No. PCT/CN2016/079163, filed on Apr. 13, 2016.

(56) References Cited

U.S. PATENT DOCUMENTS

| | | | | |
|---|---|---|---|---|
| 2006/0115157 | A1* | 6/2006 | Mori | G06K 9/00221 382/190 |
| 2006/0210124 | A1* | 9/2006 | Ishii | G06K 9/00255 382/118 |
| 2013/0226587 | A1 | 8/2013 | Cheung et al. | |
| 2013/0271361 | A1* | 10/2013 | Velusamy | G06F 3/011 345/156 |

FOREIGN PATENT DOCUMENTS

| | | |
|---|---|---|
| CN | 1839410 A | 9/2006 |
| CN | 101101752 A | 1/2008 |
| CN | 101877056 A | 11/2010 |
| CN | 102097003 A | 6/2011 |
| CN | 104134058 A | 11/2014 |
| CN | 104200146 A | 12/2014 |
| CN | 104331160 A | 2/2015 |
| CN | 104361276 A | 2/2015 |
| CN | 104637246 A | 5/2015 |
| CN | 104838339 A | 8/2015 |

OTHER PUBLICATIONS

The World Intellectual Property Organization (WIPO) International Search Report for PCT/CN2016/106752 dated Feb 28, 2017 pp. 1-2.
The State Intellectual Property Office of the People's Republic of China (SIPO) Office Action 1 for 201510827420.1 dated Jan. 17, 2019 10 Pages (including translation).
The State Intellectual Property Office of the People's Republic of China (SIPO) Office Action 1 for 201510996643.0 dated Jan. 25, 2019 8 Pages (including translation).

* cited by examiner

IMAGE PROCESSING METHOD AND APPARATUS

RELATED APPLICATION

The present disclosure claims priority to PCT Application No. PCT/CN2016/079163, filed on Apr. 13, 2016, which claims priority of Chinese Patent Application No. 2015108274201, filed on Nov. 25, 2015; PCT Application No. PCT/CN2016/106752 filed on Nov. 22, 2016, which claims priority of Chinese Patent Application No. 2015109966430, filed with the Chinese Patent Office on Dec. 26, 2015, which are incorporated by reference in its entirety.

FIELD OF THE TECHNOLOGY

The present disclosure relates to the field of Internet technologies, specifically, to the field of video image processing technologies, and in particular, to an image processing method and apparatus.

BACKGROUND OF THE DISCLOSURE

Lip recognition is usually involved in some Internet scenarios such as an identity authentication scenario. To prevent unauthorized users from cheating an identify authentication system by using a static picture, a video image in which a user talks often needs to be recorded, and then processes such as lip movement recognition is performed on the video image to determine an identity of an authorized user. In the existing technology, one solution of performing lip movement recognition processing on an image is by calculating an area of a lip region in each frame of an image in a video, and then according to a difference between areas of lip regions in frames of images, determining whether a lip movement occurred. Another solution may be by extracting an open/closed state of a lip in each frame of an image in a video, and according to an opening/closing magnitude, detecting whether a lip movement occurred. Both the solutions in the existing technology are based on a lip change magnitude. If the lip change magnitude is relatively small, neither an area change of a lip region nor an opening/closing magnitude of a lip is obvious. As a result, the accuracy of a lip movement recognition result can be improved.

SUMMARY

Embodiments of the present disclosure provide an image processing method and apparatus. A lip movement is recognized according to a lip change on an image within a span of time, so as to avoid impact of a lip change magnitude, increase accuracy of a recognition result, and improve practicability of image processing.

One aspect of the present disclosure provides an image processing method. The method includes detecting a human face region in each frame of an image in a to-be-processed video; locating a lip region in the human face region; extracting feature column pixels in the lip region from each frame of the image; building a lip change graph based on the feature column pixels; and recognizing a lip movement according to a pattern feature of the lip change graph.

The method further includes parsing the to-be-processed video to obtain at least one frame of an image; detecting a human face region in the frame of the image by using a human face recognition algorithm; and locating a lip region in the human face region by using a human face alignment algorithm.

The method further includes capturing a lip region graph from each frame of the image; extracting the feature column pixels from the lip region graph; and performing splicing processing on the extracted feature column pixels according to a time sequence of each frame of the image to obtain the lip change graph.

The method further includes determining a preset position in the lip region graph; drawing a longitudinal axis passing through the preset position; and extracting pixels along the longitudinal axis in the lip region graph. The preset position being a position of a central pixel in the lip region graph.

The method further includes calculating the pattern feature of the lip change graph, the pattern feature comprising an LBP (Local Binary Pattern) feature and/or an HOG (Histogram of Oriented Gradient) feature; and classifying the pattern feature by using a classification algorithm, to obtain a lip movement recognition result, the recognition result including a lip movement occurrence or no lip movement occurrence.

Another aspect of the present disclosure provides an image processing apparatus. A unit or a sub-unit of the apparatus refers to a combination of software instructions and hardware components, when the software instructions are executed by the processor and the hardware components, the software instructions perform the corresponding functions. The software instructions may be stored in any computer readable medium that is a part of the image processing apparatus. The apparatus includes a locating unit, configured to detect a human face region in each frame of an image in a to-be-processed video, and locate a lip region in the human face region; a building unit, configured to extract feature column pixels in the lip region from each frame of the image, to build a lip change graph; and a lip movement recognition unit, configured to perform lip movement recognition according to a pattern feature of the lip change graph.

Further, the locating unit includes a parsing unit, configured to parse the to-be-processed video to obtain at least one frame of an image; a human face recognition unit, configured to detect a human face region in each frame of an image by using a human face recognition algorithm; and a human face alignment unit, configured to locate a lip region in the human face region by using a human face alignment algorithm.

Further, the building unit includes a capturing unit, configured to capture a lip region graph from each frame of the image; an extraction unit, configured to extract a feature column pixel graph from the lip region graph; and a splicing processing unit, configured to perform splicing processing on the extracted feature column pixel graph according to a time sequence of each frame of the image, to obtain the lip change graph.

Further, the extraction unit includes a position determining unit, configured to determine a position in the lip region graph; a longitudinal-axis determining unit, configured to draw a longitudinal axis passing through the position; and a feature column pixel extraction unit, configured to extract pixels along the longitudinal axis in the lip region graph.

The position being a position of a central pixel in the lip region graph.

Further, the lip movement recognition unit includes a calculation unit, configured to calculate the pattern feature of the lip change graph, the pattern feature comprising an LBP feature and/or an HOG feature; and a classification unit, configured to classify the pattern feature by using a classification algorithm to obtain a lip movement recognition result, the recognition result comprising a lip movement occurrence or no lip movement occurrence.

Another aspect of the present disclosure provides a lip recognition system. The system includes a memory, storing a group of program code; and a processor, configured to execute the program code to perform the following operations: detecting a human face region in each frame of an image in a to-be-processed video, and locating a lip region in the human face region; extracting feature column pixels in the lip region from each frame of the image, to build a lip change graph; and recognizing a lip movement according to a pattern feature of the lip change graph.

Further, the detecting a human face region in each frame of an image in a to-be-processed video, and locating a lip region in the human face region includes parsing the to-be-processed video to obtain at least one frame of an image; detecting a human face region in each frame of an image by using a human face recognition algorithm; and locating a lip region in the human face region by using a human face alignment algorithm.

Further, the extracting feature column pixels in the lip region from each frame of the image to build a lip change graph includes capturing a lip region graph from each frame of the image; extracting a feature column pixels from the lip region graph; and performing splicing processing on the extracted feature column pixels according to a time sequence of each frame of the image, to obtain the lip change graph.

Further, the extracting feature column pixels graph from the lip region graph includes determining a position in the lip region graph; drawing a longitudinal axis passing through the position; and extracting column pixels along the longitudinal axis in the lip region graph.

Further, the position being a position of a central pixel in the lip region graph.

Further, the recognizing a lip movement according to a pattern feature of the lip change graph includes calculating the pattern feature of the lip change graph, the pattern feature comprising an LBP feature and/or an HOG feature; and classifying the pattern feature by using a preset classification algorithm, to obtain a lip movement recognition result, the recognition result comprising: a lip movement occurs or no lip movement occurs.

In the embodiments of the present disclosure, a human face region is detected and a lip region is located in each frame of an image included in a video, and a feature column pixel in the lip region is extracted from each frame of the image, to build a lip change graph. Because the lip change graph comes from each frame of the image, the lip change graph can reflect a span of time for the images. Lip movement recognition is performed according to a pattern feature of the lip change graph, to obtain a recognition result. That is, a lip movement is recognized according to a lip change within the span of time. Therefore, impact of a lip change magnitude can be avoided, and recognition efficiency and accuracy of the recognition result may be improved.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts shall fall within the protection scope of the present disclosure.

In the embodiments of the present disclosure, a human face region is detected and a lip region is located in each frame of an image included in a video. Feature column pixels in the lip region are extracted from each frame of the image, to build a lip change graph. Because the lip change graph comes from each frame of the image, the lip change graph can reflect a span of time for the images. Lip movement recognition is performed according to a pattern feature of the lip change graph, to obtain a recognition result. That is, a lip movement is recognized according to a lip change within the span of time. Therefore, impact of a lip change magnitude can be reduced, and recognition efficiency and accuracy of a recognition result can be improved.

The image processing method in the embodiments of the present disclosure may be applied to many Internet scenarios. For example, in a voice input scenario, a voice obtaining process may be controlled by performing lip movement recognition on a video in which a user talks. For another example, in an identity authorization scenario, an identity of an authorized user may be determined by performing lip movement recognition on a video in which a user talks, so as to prevent an unauthorized user from cheating by using a static picture. Similarly, the image processing apparatus in the embodiments of the present disclosure may be implemented in various devices such as in a terminal, or may in a server.

Figure 1:
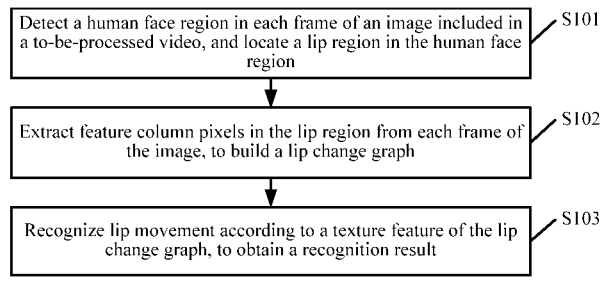
FIG. 1 is a flowchart of an image processing method according to an embodiment of the present disclosure.

An embodiment of the present disclosure provides an image processing method. Referring to FIG. 1, the method may include the following steps S101 to S103.

S101: Detect a human face region in each frame of an image included in a to-be-processed video, and locate a lip region in the human face region.

The to-be-processed video may be a video recorded in real time. For example, when a user initiates a voice input request to a terminal, the terminal may record, in real time and as the to-be-processed video, a video in which the user talks. The to-be-processed video may alternatively be a received real-time video. For example, when a server performs identity authorization on a user on a terminal side, the server may receive, as the to-be-processed video, a video that is recorded by a terminal in real time and in which the user talks. In the human face recognition technology, a specific criteria is used for scanning to determine whether a given image includes a human face, and after it is determined that the given image includes a human face, a position, a size, and an angle of the human face in the image can be determined. In the human face recognition technology, a specific algorithm is used for distinguishing between contours such as the eyes, the nose, and the lips on a human face according to a position, a size, and an angle of the human face. In a process of performing step S101, the human face recognition technology is specifically involved in the method in this embodiment. Specifically, when step S101 is performed, the method includes the following steps s11 to s13:

s11: Parse the to-be-processed video to obtain at least one frame of an image. The video includes frames of images that are arranged in time sequence. Therefore, the frames of the images can be obtained provided that the frame dividing process is performed on the to-be-processed video.

s12: Detect a human face region in each frame of an image by using a human face recognition algorithm.

The human face recognition algorithm may be any type of human face recognition algorithm, including but not limited to a PCA (Principal Component Analysis) algorithm, a flexible model method, a hidden Markov model method, and the like. For each frame of an image obtained after the frame dividing process is performed on the video, a human face region may be determined by using the human face recognition algorithm. The human face region is used for presenting a position, a size, and an angle of a human face in each frame of the image.

s13: Locate a lip region in the human face region by using a human face alignment algorithm.

The human face alignment algorithm may be an algorithm to locate several facial key points and landmarks (e.g. eye corner, mouth corner) on the facial images, including but not limited to a whole-face-based Lasso regression registration algorithm, a wavelet-domain algorithm, and the like. For a position, a size, and an angle of a human face that are presented in a human face region in each frame of an image, a lip region may be located by using the human face alignment algorithm.

S102: Extract feature column pixels in the lip region from each frame of the image, to build a lip change graph.

The lip change graph may reflect a lip change within a span of time. A video includes frames of images that are arranged in time sequence, and the video can dynamically reflect a lip change within a span of time for the frames of the images. Therefore, in this step, the lip change graph may be built by using change characteristics of the lip region in each frame of the image. In a specific implementation, when step S102 is performed, the method specifically includes the following steps s21 to s23.

s21: Capture a lip region graph from each frame of the image. Because the lip region has been located in each frame of the image, in step s21, the lip region graph can be directly captured from each frame of the image. In this case, the first lip region graph may be captured from the first frame of the image, the second lip region graph may be captured from the second frame of the image, and so on.

s22: Extract a feature column pixel graph from the lip region graph.

Feature column pixels are a column of pixels that are in a frame of an image and that can reflect lip change characteristics. An image including the feature column pixels is referred to as a feature column pixel graph. In specific implementations, when step s22 is performed, the method specifically includes the following steps ss221 to ss223.

ss221: Determine a preset position in the lip region graph.

The preset position may be a position of any pixel in the lip region graph. Because a change in a lip center is most obvious during a lip movement, in this embodiment of the present disclosure, the preset position may be a position of a central pixel in the lip region graph.

ss222: Draw a longitudinal axis passing through the preset position.

ss223: Extract, as the feature column pixel graph, a column pixel graph including all pixels along the longitudinal axis in the lip region graph.

During the lip movement, a lip change may be represented as open lips, which is a longitudinal lip change. Therefore, in step ss222 and step ss223, the feature column pixel graph may be extracted longitudinally according to the preset position. It may be understood that if the preset position is the position of the central pixel in the lip region graph, the extracted feature column pixel graph is a column pixel graph in the middle of the lip region.

s23: Perform splicing processing on the extracted feature column pixel graph according to a time sequence of each frame of the image, to obtain the lip change graph.

According to step s22, the feature column pixel graph may be extracted at the preset position in each frame of the image, in step s23, the lip change graph obtained after the feature column pixel graphs being extracted from all the frames of the images in s23 may also reflect a lip change at the preset position. An example in which the preset position is the position of the central pixel in the lip region graph is used. A central column pixel graph in the lip region is extracted from the first frame of the image and may be referred to as the first central column pixel graph; and another central column pixel graph in the lip region is extracted from the second frame of the image and may be referred to as the second central column pixel graph, and so on. In this case, splicing processing in step s23 may be: splicing the second central column pixel graph laterally after the first central column pixel graph, splicing the third central column pixel graph laterally after the second central column pixel graph, and so on, to obtain a lip change graph. The lip change graph reflects a change in a lip center.

S103: Perform lip movement recognition according to a pattern feature of the lip change graph, to obtain a recognition result.

Lip movement recognition is a process of determining whether a lip movement occurs. When step S103 is performed, the method specifically includes the following step s31 and step s32.

s31: Calculate the pattern feature of the lip change graph, where the pattern feature includes but is not limited to an LBP (Local Binary Pattern) feature and/or an HOG (Histogram of Oriented Gradient) feature.

The LBP feature may effectively describe and measure local texture information of an image, and has prominent advantages such as rotation invariance and gray-scale invariance. When step s31 is performed, in the method, the LBP feature of the lip change graph may be calculated by using an LBP algorithm. The HOG feature is a feature description used for object detection in image processing. When step s31 is performed, in the method, the HOG feature of the lip change graph may be calculated by using an HOG algorithm. It may be understood that, the pattern feature may further include other features such as an SIFT (Scale-Invariant Feature Transform) feature. Therefore, alternatively, when step s31 is performed, in the method, the pattern feature of the lip change graph may be calculated by using other algorithms.

s32: Classify the pattern feature by using a preset classification algorithm, to obtain a lip movement recognition result, where the recognition result includes: a lip movement occurs or no lip movement occurs.

The preset classification algorithm may include but is not limited to a Bayesian algorithm, a logistic regression algorithm, and an SVM (Support Vector Machine) algorithm. Using the SVM algorithm as an example, the pattern feature is used as an input parameter to be substituted in an SVM algorithm classifier. The SVM algorithm classifier may output a classification result (that is, the lip movement recognition result).

According to implementation of the image processing method in this embodiment of the present disclosure, a human face region is detected and a lip region is located in each frame of an image included in a video. A feature column pixel in the lip region is extracted from each frame of the image to build a lip change graph. Because the lip change graph comes from each frame of the image, the lip change graph can reflect a span of time for the images. Lip movement recognition is performed according to a pattern feature of the lip change graph, to obtain a recognition result. That is, a lip movement is recognized according to a lip change within the span of time. Therefore, impact of a lip change magnitude can be avoided, and recognition efficiency and accuracy of recognition result may be improved.

Figure 2:
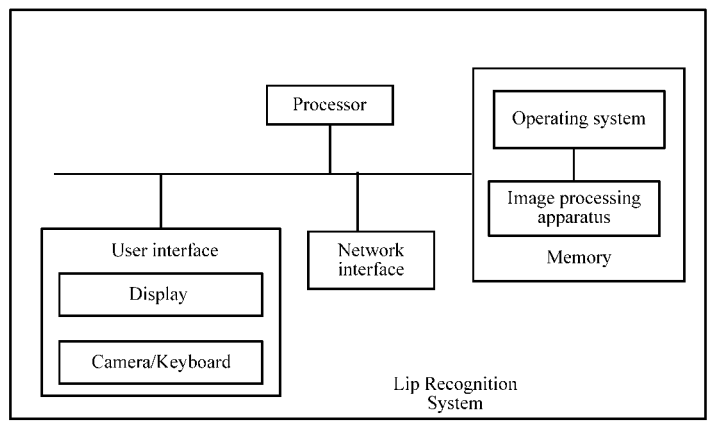
FIG. 2 is a schematic structural diagram of an Lip recognition system according to an embodiment of the present disclosure.

Based on the image processing method shown in the foregoing embodiments, an embodiment of the present disclosure further provides a lip recognition system. The lip recognition system may include a terminal or a server. Referring to FIG. 2, an internal structure of the lip recognition system may include but is not limited to a processor, a user interface, a network interface, and a memory. The processor, the user interface, the network interface, and the memory in the lip recognition system may be connected by using a bus or in another manner. In FIG. 2, a bus connection is used as an example in this embodiment of the present disclosure.

The user interface is a medium for implementing interaction and information exchange between a user and the lip recognition system. A specific implementation of the user interface may include a display for output, a camera or a keyboard for input, and the like. It should be noted that the camera may be any type of image or video taking device, the keyboard herein may be a physical keyboard, a virtual touchscreen keyboard, or a combination of a physical keyboard and a virtual touchscreen keyboard. The camera may be used to record images to be processed for lip recognition. The keyboard may be used to control (e.g., start, stop) the lip recognition system. The processor (or referred to as a CPU (Central Processing Unit, central processing unit)) is a computing core and control core of the lip recognition system. The processor can parse various instructions in the lip recognition system and process various data. The memory (Memory) is a memory device in the lip recognition system and is configured to store programs and data. It may be understood that the memory herein may be a high-speed RAM memory, a non-volatile memory (non-volatile memory), for example, at least one disk memory, or at least one storage apparatus far from the processor. The memory provides storage space. The storage space stores an operating system of the lip recognition system, and also stores an image processing apparatus.

Figure 3:
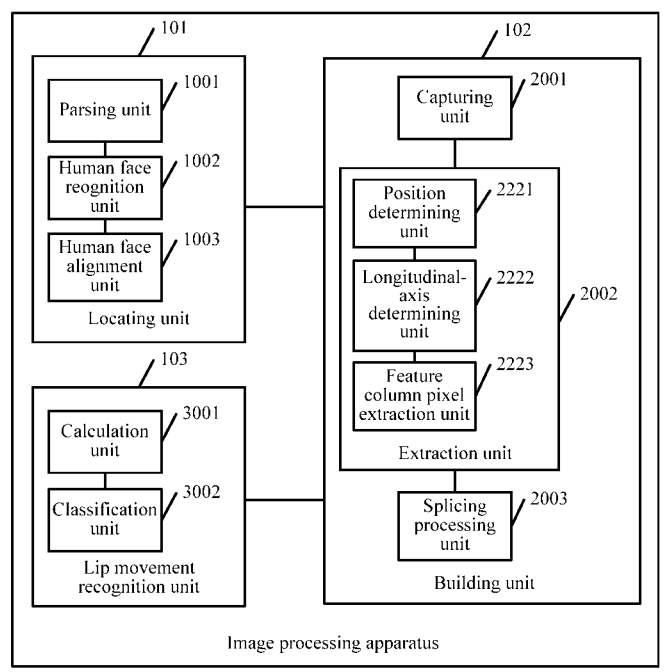
FIG. 3 is a schematic structural diagram of an image processing apparatus according to an embodiment of the present disclosure.

In the embodiment of the present disclosure, the lip recognition system can perform the corresponding steps in the method process shown in FIG. 1 by running the image processing apparatus in the memory. Further referring to FIG. 3, the image processing apparatus runs the following units: a locating unit 101, configured to detect a human face region in each frame of an image included in a to-be-processed video, and locate a lip region in the human face region; a building unit 102, configured to extract feature column pixels in the lip region from each frame of the image, to build a lip change graph; and a lip movement recognition unit 103, configured to perform lip movement recognition according to a pattern feature of the lip change graph, to obtain a recognition result.

In one embodiment, in a process of running the locating unit 101, the image processing apparatus specifically runs the following units: a parsing unit 1001, configured to parse the to-be-processed video to obtain at least one frame of an image; a human face recognition unit 1002, configured to detect a human face region in each frame of an image by using a human face recognition algorithm; and a human face alignment unit 1003, configured to locate a lip region in the human face region by using a human face alignment algorithm.

In one embodiment, in a process of running the building unit 102, the image processing apparatus specifically runs the following units: a capturing unit 2001, configured to capture a lip region graph from each frame of the image; an extraction unit 2002, configured to extract a feature column pixel graph from the lip region graph; and a splicing processing unit 2003, configured to perform splicing processing on the extracted feature column pixel graph according to a time sequence of each frame of the image, to obtain the lip change graph.

In one embodiment, in a process of running the extraction unit 2002, the image processing apparatus specifically runs the following units: a position determining unit 2221, configured to determine a preset position in the lip region graph, where preferably, the preset position is a position of a central pixel in the lip region graph; a longitudinal-axis determining unit 2222, configured to draw a longitudinal axis passing through the preset position; and a feature column pixel extraction unit 2223, configured to extract, as the feature column pixel graph, a column pixel graph including all pixels along the longitudinal axis in the lip region graph.

In one embodiment, in a process of running the lip movement recognition unit 103, the image processing apparatus specifically runs the following units: a calculation unit 3001, configured to calculate the pattern feature of the lip change graph, where the pattern feature includes an LBP feature and/or an HOG feature; and a classification unit 3002, configured to classify the pattern feature by using a preset classification algorithm, to obtain a lip movement recognition result, where the recognition result includes: a lip movement occurs or no lip movement occurs.

Similar to the method shown in FIG. 2, according to running of the image processing apparatus in this embodiment of the present disclosure, a human face region is detected and a lip region is located in each frame of an image included in a video, and a feature column pixel in the lip region is extracted from each frame of the image, to build a lip change graph. Because the lip change graph comes from each frame of the image, the lip change graph can reflect a span of time for the images. Lip movement recognition is performed according to a pattern feature of the lip change graph, to obtain a recognition result. That is, a lip movement is recognized according to a lip change within the span of time. Therefore, impact of a lip change magnitude can be avoided, and recognition efficiency and accuracy of the recognition result may be improved.

A person of ordinary skill in the art may understand that all or some of the processes of the method in the foregoing embodiments may be implemented by a computer program instructing relevant hardware. The program may be stored in a computer readable storage medium. During execution, the program may include the processes in the foregoing method embodiment. The storage medium may be a disk, an optical disc, a read-only memory (Read-Only Memory, ROM), random access memory (Random Access Memory, RAM), or the like.

The foregoing descriptions are merely embodiments of the present disclosure, but are not intended to limit the present disclosure. Therefore, equivalent changes made according to the claims of the present disclosure still fall within the scope of the present disclosure.

What is claimed is:

1. An image processing method, comprising:
   detecting a human face region in each image frame in a to-be-processed video containing a plurality of image frames;
   locating a lip region in the human face region in each image frame;
   generating a lip region map according to the located lip region in each image frame;
   building a lip change map, including:
      generating a first feature pixel column of the lip change map by selecting a column of pixels from the lip region map of a first image frame in the plurality of image frames;
      generating a second feature pixel column of the lip change map by selecting a column of pixels from the lip region map of a second image frame in the plurality of image frames;
      stitching the second feature pixel column laterally after the first feature pixel column in the lip change map;
      generating one or more additional feature pixel columns of the lip change map by selecting a column of pixels from the lip region map of each of one or more additional image frames in the plurality of image frames; and
      laterally stitching the one or more additional feature pixel columns after the second feature pixel column according to a time sequence of the one or more additional image frames; and
   recognizing a lip movement according to a pattern feature of the lip change map.

2. The method according to claim 1, wherein detecting a human face region in each image frame in the to-be-processed video, and locating a lip region in the human face region in each image frame comprises:
   parsing the to-be-processed video to obtain the plurality of image frames;
   detecting a human face region in each image frame by using a human face recognition algorithm; and
   locating the lip region in the human face region of each image frame by using a human face alignment algorithm.

3. The method according to claim 1, wherein selecting a column of pixels from a lip region map comprises:
   selecting a position in the lip region map;
   drawing a longitudinal axis passing through the selected position; and
   selecting pixels along the longitudinal axis in the lip region map.

4. The method according to claim 3, wherein the selected position is a position of a central pixel in the lip region map.

5. The method according to claim 1, wherein recognizing a lip movement according to a pattern feature of the lip change map comprises:
   calculating the pattern feature of the lip change map, the pattern feature comprising at least one of an LBP (Local Binary Pattern) feature or or a HOG (Histogram of Oriented Gradient) feature; and
   classifying the pattern feature by using a classification algorithm, to obtain a lip movement recognition result, the lip movement recognition result being a determination on a lip movement occurrence or no lip movement occurrence.

6. A lip movement recognition system, comprising:
   a memory, storing a group of program code; and
   a processor, configured to execute the program code to perform:
      detecting a human face region in each image frame in a to-be-processed video containing a plurality of image frames;
      locating a lip region in the human face region in each image frame;
      generating a lip region map according to the located lip region in each image frame;
      building a lip change map, including:
         generating a first feature pixel column of the lip change map by selecting a column of pixels from the lip region map of a first image frame in the plurality of image frames;
         generating a second feature pixel column of the lip change map by selecting a column of pixels from the lip region map of a second image frame in the plurality of image frames;
         stitching the second feature pixel column laterally after the first feature pixel column in the lip change map;
         generating one or more additional feature pixel columns of the lip change map by selecting a column of pixels from the lip region map of each of one or more additional image frames in the plurality of image frames; and
         laterally stitching the one or more additional feature pixel columns after the second feature pixel column according to a time sequence of the one or more additional image frames; and
      recognizing a lip movement according to a pattern feature of the lip change map.

7. The lip movement recognition system according to claim 6, wherein detecting a human face region in each image frame in the to-be-processed video, and locating a lip region in the human face region comprises:
   parsing the to-be-processed video to obtain the plurality of image frames;
   detecting a human face region in each image frame by using a human face recognition algorithm; and
   locating the lip region in the human face region of each image frame by using a human face alignment algorithm.

8. The lip movement recognition system according to claim 6, wherein selecting a column of pixels from a lip region map comprises:
   selecting a position in the lip region map;
   drawing a longitudinal axis passing through the selected position; and
   selecting column pixels along the longitudinal axis in the lip region map.

9. The lip movement recognition system according to claim 8, the position being a position of a central pixel in the lip region map.

10. The lip movement recognition system according to claim 6, wherein recognizing a lip movement according to a pattern feature of the lip change map comprises:
   calculating the pattern feature of the lip change map, the pattern feature comprising at least one of an LBP feature or a HOG feature; and
   classifying the pattern feature by using a preset classification algorithm, to obtain a lip movement recognition result, the lip movement recognition result being a determination on a lip movement occurs or no lip movement occurs.

11. A non-transitory computer-readable storage medium storing program instructions which, when being executed by at least one processor, cause the at least one processor to perform:
   detecting a human face region in each image frame in a to-be-processed video containing a plurality of image frames;
   locating a lip region in the human face region in each image frame;
   generating a lip region map according to the located lip region in each image frame;
   building a lip change map, including:
      generating a first feature pixel column of the lip change map by selecting a column of pixels from the lip region map of a first image frame in the plurality of image frames;
      generating a second feature pixel column of the lip change map by selecting a column of pixels from the lip region map of a second image frame in the plurality of image frames;
      stitching the second feature pixel column laterally after the first feature pixel column in the lip change map;
      generating one or more additional feature pixel columns of the lip change map by selecting a column of pixels from the lip region map of each of one or more additional image frames in the plurality of image frames; and
      laterally stitching the one or more additional feature pixel columns after the second feature pixel column according to a time sequence of the one or more additional image frames; and
   recognizing a lip movement according to a pattern feature of the lip change map.

12. The computer-readable medium according to claim 11, wherein detecting a human face region in each image frame in the to-be-processed video, and locating a lip region in the human face region in each image frame comprises:
   parsing the to-be-processed video to obtain the plurality of image frames;
   detecting a human face region in each image frame by using a human face recognition algorithm; and
   locating the lip region in the human face region of each image frame by using a human face alignment algorithm.

13. The computer-readable medium according to claim 11, wherein selecting a column of pixels from a lip region map comprises:
   selecting a position in the lip region map;
   drawing a longitudinal axis passing through the selected position; and
   selecting pixels along the longitudinal axis in the lip region map.

14. The computer-readable medium according to claim 13, wherein the selected position is a position of a central pixel in the lip region map.

15. The computer-readable medium according to claim 11, wherein recognizing a lip movement according to a pattern feature of the lip change map comprises:
   calculating the pattern feature of the lip change map, the pattern feature comprising at least one of an LBP (Local Binary Pattern) feature or a HOG (Histogram of Oriented Gradient) feature; and
   classifying the pattern feature by using a classification algorithm, to obtain a lip movement recognition result, the lip movement recognition result being a determination on a lip movement occurrence or no lip movement occurrence.

16. The method according to claim 1, wherein the lip change map is a two-dimensional map.

17. The method according to claim 5, wherein the classification algorithm is one of: a Bayesian algorithm, a logistic regression algorithm, and an SVM (Support Vector Machine) algorithm.

* * * * *